Figure 1:
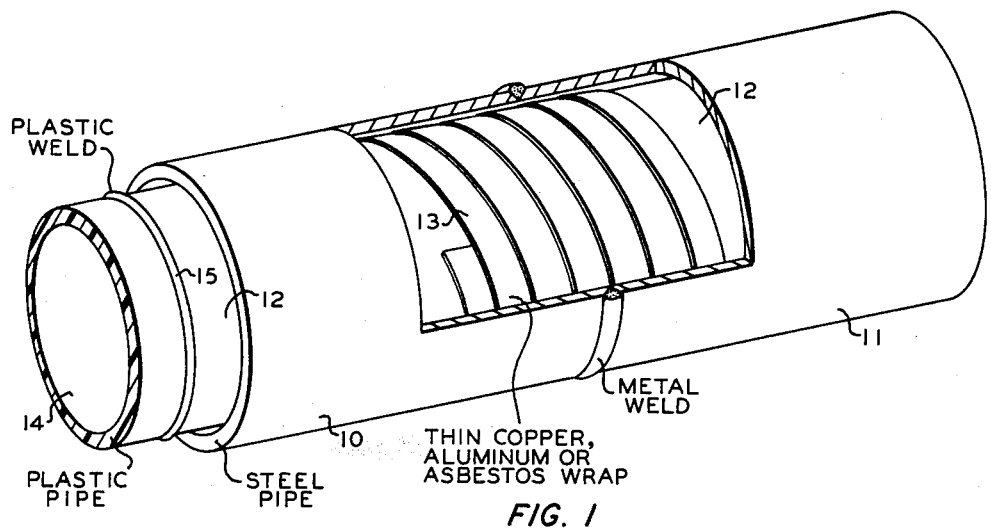

July 21, 1964   W. D. DE GEER, JR   3,141,234
METHOD OF WELDING CONDUITS HAVING A RESINOUS LINER
Filed May 19, 1961

INVENTOR.
W.D. DEGEER, JR.
BY Hudson & Young
ATTORNEYS

United States Patent Office 3,141,234
Patented July 21, 1964

3,141,234
METHOD OF WELDING CONDUITS HAVING
A RESINOUS LINER
William D. De Geer, Jr., Fairfax, Okla., assignor to
Phillips Petroleum Company, a corporation of
Delaware
Filed May 19, 1961, Ser. No. 111,199
5 Claims. (Cl. 29—157)

This invention relates to a method of making corrosion resistant conduits. In one aspect this invention relates to a method of making a welded conduit having a resinous liner therein. In another aspect the invention relates to a method for protecting the resinous liner of a conduit during the welding together of sections of the conduit. In still another aspect this invention relates to a method for the simultaneous installation of a metal conduit and a resinous liner for said conduit.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported, cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

Figure 2:
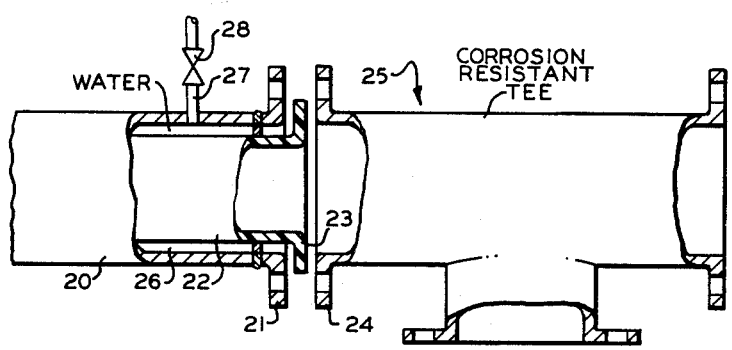

It is an object of this invention to provide a method for installing long sections of a resinous conduit inside a metal conduit to prevent corrosion of the metal conduit by the action of fluids transported therethrough. It is also an object of this invention to provide a method for protecting a resinous conduit positioned within a metal conduit wherein sections of the metal conduit are welded together with the resinous conduit positioned therein. A further object of this invention is to provide a method of making a metal conduit containing therein a resinous conduit liner wherein the surface of the resinous conduit is covered with a protective material at those points where the metal conduit sections are welded together. A further object of this invention is to apply to the outer surface of a resinous conduit a coating which will insulate the resinous conduit from the heat generated in welding together sections of a metal conduit surrounding the resinous conduit and/or a coating which will disperse the heat generated in such welding step. Other and further objects and advantages will become apparent to one skilled in this art upon studying the disclosure including the appended drawing wherein:

FIGURE 1 illustrates the welding together of sections of metal conduit with the protective coating of material applied to the surface of the resinous conduit; and FIGURE 2 illustrates one means for sealing the resinous conduit liner to the metal conduit.

Referring now to the drawing, and to FIGURE 1 in particular, a section of metal conduit 10 is shown being welded to a similar conduit section 11. The cutaway section illustrates the resinous conduit 12 wrapped with a heat-insulating or heat-dispersing material 13. The resinous conduit section 12 is shown welded to a similar resinous conduit section 14 and the weld is indicated at 15. It should be noted that the resinous conduit section 12 extends beyond the metal conduit section 11 to facilitate welding the succeeding resinous conduit section 14 to the resinous conduit section 12.

FIGURE 2 illustrates one method for sealing the resinous liner to the metal conduit. A standard metal flange indicated at 21 is welded to a metal conduit 20 and the resinous conduit 22 is flared at the end as indicated at 23 and the flared end 23 is secured between flange 21 and a matching flange 24, illustrated as being an integral part of a corrosion resistant T indicated at 25. The corrosion resistant T 25 can be a corrosion resistant metal such as stainless steel, or a standard metal flange lined with a material such as glass, rubber, resin or other corrosion resistant material. The flange members illustrated are conventional bolted flanges. Other methods and means for sealing the resinous liner to the metal conduit can be employed.

After installation of the resinous liner in the metal conduit the annulus 26 between the resinous liner and the metal conduit can be filled with water by means of conduit 27 and valve 28. A similar valve and conduit assembly can be employed at the other end of conduit 20 to vent the air from the annulus as the water is introduced.

Manageable lengths of steel conduit and resinous conduit liner can be joined together according to this invention to provide pipe lines of practically any length with a minimum of welds of the conduit with the liner in place and these welds can be accomplished without damage to the resinous liner by means of the wrapping of heat-insulating and/or heat-dispersing materials placed around the resinous liner at the points where the metal conduits are to be welded. Sheets or strips of asbestos paper or sheets or strips of glass cloth can be utilized as the insulating material and sheets or strips of heat-conducting metals such as aluminum foil or copper foil can be employed as the heat-dispersing materials. A particularly effective and preferred method is to wrap a section of the resinous conduit with an insulating material such as asbestos paper so that the wrapping extends for one or two feet on either side of the metal weld and then to apply a wrapping of metal foil upon the insulating material so that both the effects of insulation and heat dispersion are obtained with a minimum thickness of materials employed.

It has been found that sections of conduit as long as 500 feet can be joined together according to the method of this invention because the resinous liner is relatively light in weight as compared to the metal conduit and the coefficient of friction between the resinous liner and the metal conduit is such that the liner can be placed in the conduit easily.

As hereinbefore stated, it is desirable that at least the first section of resinous liner should be longer than the first section of metal conduit so as to facilitate welding together the sections of resinous conduit. These sections of resinous conduit can conveniently be welded together by heating the adjacent ends of the resinous conduit to the softening point of the resin and then pressing the softened ends of the conduit together to form a permanent fusion joint. It has been found convenient to install the section of resinous liner in the section of metal conduit and to wrap the protective material on the resinous conduit prior to welding the sections of resinous conduit together. It is, of course, necessary to determine the proper position for wrapping the protective material on the resinous conduit prior to placing the resinous conduit within the metal conduit.

The resinous tube which provides the impermeable, corrosion-resistant liner can be any impermeable, resinous material such as the so-called organic plastics including solid polymers of olefins, nylon, polyvinylchloride, and the like; and mixtures thereof. A particularly preferred class of materials for making the resinous tubes of this invention is the class of solid linear polymers of 1-olefins, particularly solid linear polyethylene and solid copolymers of ethylene and higher olefins such as propylene, 1-butene, and the like, prepared by the low pressure polymerization of ethylene or copolymerization of ethylene and a higher molecular weight olefin in the presence of an organic diluent and a solid catalyst. Such polyethylene and copolymers can be prepared by the method described in U.S. Patent 2,825,721, issued March 4, 1958, to J. P. Hogan et al.

After the metal conduit and its associated resinous liner are completely assembled and the ends of the resinous liner are sealed to the ends of the metal conduit, the annular space between the conduit and its liner can be filled with fresh water. This can be done by previously installed openings at the high and low points of the conduit. After the air in the annulus has been displaced by water, the openings are sealed. The water, being substantially noncompressible, will transmit internal pressure to the metal conduit.

A pipe line installed in accordance with the present invention provides a corrosion-resistant pipe line which is capable of withstanding internal pressures which can be tolerated by the metal conduit and which is flexible in that the conduit and its associated lining are not rigid as in the case of cement lined pipe. A pipe line installed according to the invention will withstand bending, shock impacts and stresses resulting from changes in temperature whereas the rigid cement lining of a cement lined pipe would be subject to fracturing under such conditions.

Reasonable variations and modifications are possible within the scope of this disclosure without departing from the spirit and scope of the invention.

That which is claimed is:

1. The method of installing a resinous liner in a metal conduit wherein metal conduit sections are welded together with the liner inside said conduit which comprises wrapping a layer of protective material around the resinous liner at the locus where the metal conduit sections are to be welded together; welding the conduit sections together; sealing the annulus between the conduit and the liner; and filling the annulus with water.

2. The method of claim 1 wherein the protective material is a heat dispersing metal.

3. The method of claim 1 wherein the protective material is an insulating material.

4. The method of claim 1 wherein the protective material is a first layer of an insulating material and a second layer of a heat dispersing metal.

5. The method of installing a metal pipe line having a resinous liner therein which comprises placing a first manageable length of a section of conduit in position; inserting a section of resinous liner of greater length than that of said section of conduit in said conduit; wrapping a layer of asbestos around a portion of said resinous liner; wrapping a layer of aluminum over said layer of asbestos; positioning said wrapped portion with its center flush with one end of said conduit section; placing a second manageable length of a section of conduit over the resinous liner extending from said first conduit section and in welding contact with said first conduit section; welding said conduit sections together; repeating the above steps until the desired length of conduit and liner is installed; sealing the annulus between the conduit and liner at each end of the installation; and replacing the air in said annulus with water.

References Cited in the file of this patent

UNITED STATES PATENTS

| | | |
|---|---|---|
| 128,411 | Matthews | June 25, 1872 |
| 714,903 | Hinds | Dec. 2, 1902 |
| 942,184 | Persons | Dec. 7, 1909 |
| 1,961,117 | Wall | May 29, 1934 |
| 2,512,116 | Siebels | June 20, 1950 |
| 2,915,089 | Horsting | Dec. 1, 1959 |